Figure 1:
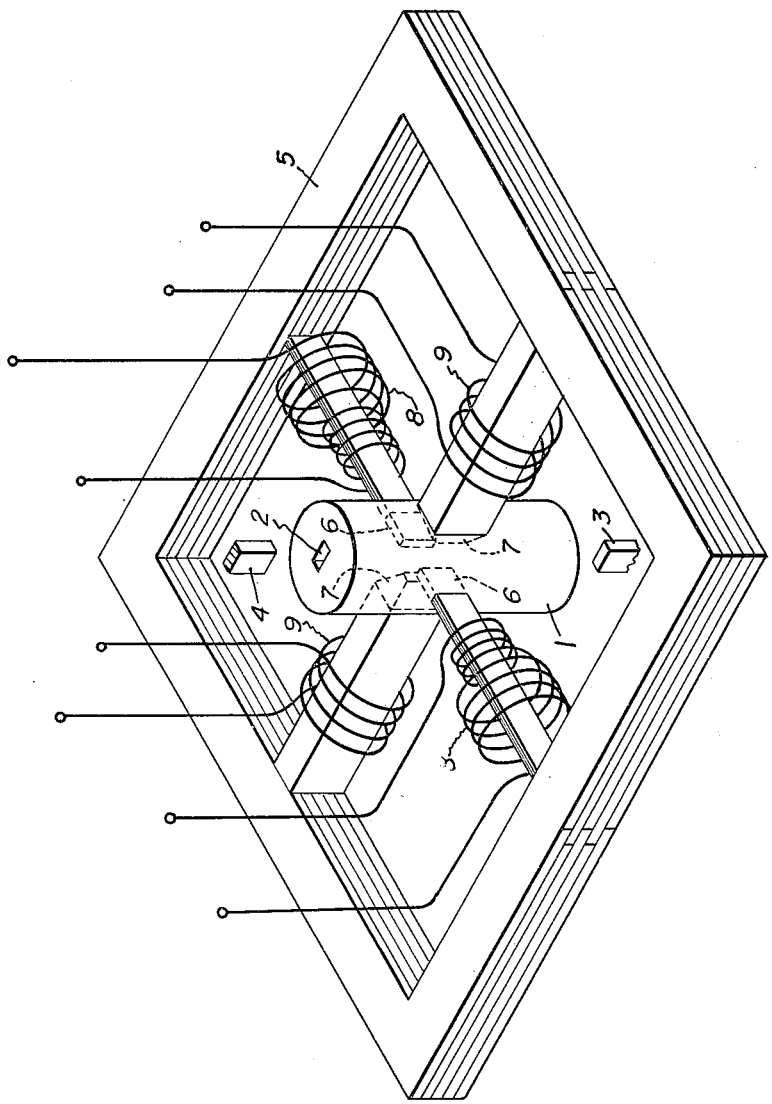

Sept. 12, 1961 R. B. FALK ET AL 2,999,271
MAGNETIC MATERIAL
Filed Aug. 30, 1960 2 Sheets-Sheet 1

Inventors:
Richard B. Falk;
Gerald L. Hatinger;
George D. Hooper;
by
Their Attorney.

Sept. 12, 1961 R. B. FALK ET AL 2,999,271
MAGNETIC MATERIAL
Filed Aug. 30, 1960 2 Sheets-Sheet 2
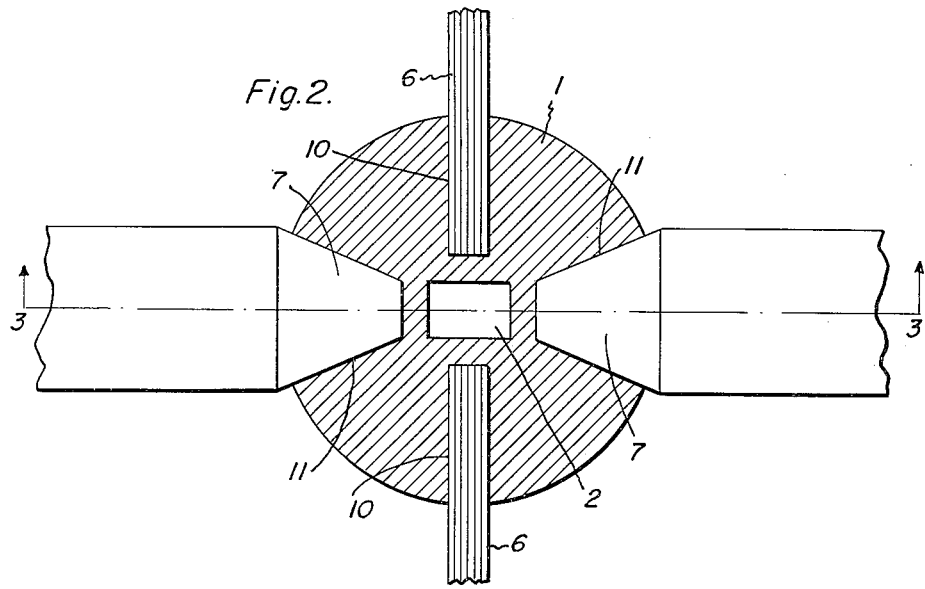
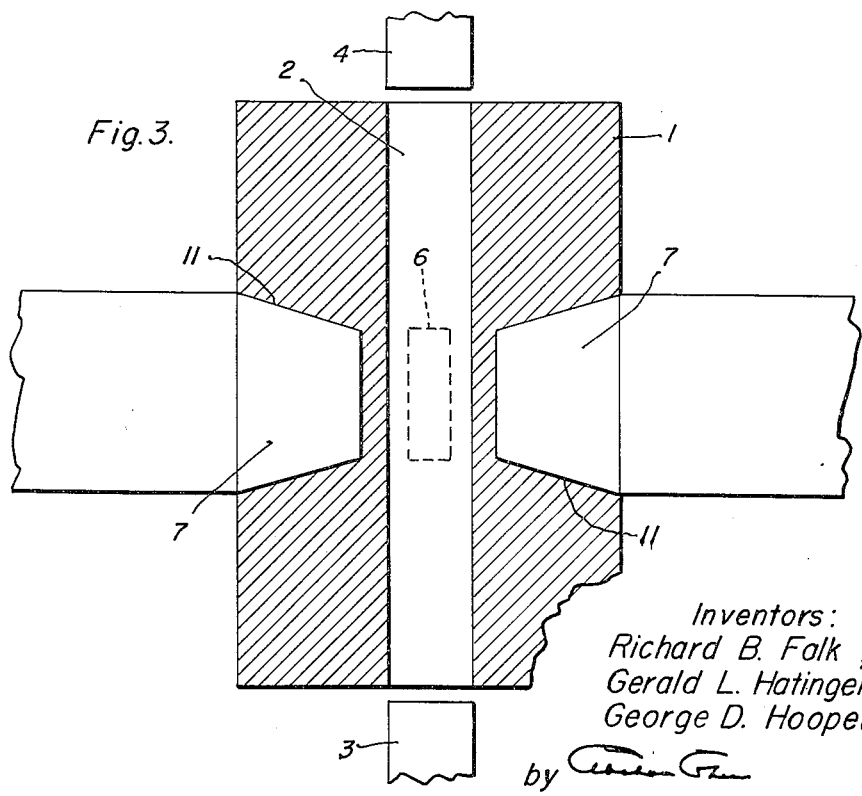
Inventors:
Richard B. Falk;
Gerald L. Hatinger;
George D. Hooper,
by 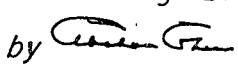
Their Attorney.

United States Patent Office 2,999,271
Patented Sept. 12, 1961

2,999,271
MAGNETIC MATERIAL
Richard B. Falk, Greenville, Gerald L. Hatinger, Edmore, and George D. Hooper, Greenville, Mich., assignors to General Electric Company, a corporation of New York
Filed Aug. 30, 1960, Ser. No. 52,796
7 Claims. (Cl. 18—16.5)

This invention relates to a process and apparatus for orienting and compacting fine particle magnetic material.

Copending application, Serial No. 500,078, filed April 8, 1955, assigned to the same assignee as the present invention, discloses a new type of magnetic material exhibiting vastly improved magnetic properties. These magnetic materials comprise elongated magnetic particles having transverse dimensions which are those of a single magnetic domain. The improved magnetic properties of the elongated, single domain magnetic materials are principally attributed to the shape anisotropy of the magnetic particles. The elongated, single domain magnetic particles are prepared by electroplating iron or iron-cobalt alloys into a molten metal cathode, such as mercury, under quiescent interface conditions between the molten metal cathode and the electrolyte.

In the process of converting the electrodeposited magnetic material into finished magnets, a slurry of the elongated, single domain magnetic particles and mercury is ordinarily pressed in the presence of a direct current field to align the particles and to remove mercury. The resulting preforms, after removal of the remaining mercury, are then ground into a powder. Each powder particle itself, after grinding, contains a large number of aligned, elongated, single domain magnetic particles. The energy product of a magnet is proportional to its degree of orientation. The highly anisotropic powder must therefore be realigned when compacted into the final magnet shape to obtain optimum magnetic properties.

Previous attempts to align the highly anisotropic powder by the use of magnetic or electrical fields have resulted in a 25 to 35% loss of particle alignment, and a 40 to 60% loss of the total available magnetic energy.

It is therefore a principal object of the present invention to provide a method and apparatus for both orienting and compacting fine particle magnetic materials into their final magnet shape.

An additional object of the present invention is to provide a method for producing fine particle magnets having a higher degree of particle alignment than was heretofore possible.

An additional object of the present invention is to provide a simple, flexible, and inexpensive apparatus for the compaction and alignment of fine particle magnetic materials.

The present invention involves the discovery that fine particle magnetic powder, whose properties are derived from shape anisotropy, may be oriented and compacted by simultaneously applying an alternating current (A.C.) and direct current (D.C.) field to a quantity of said powder and then compacting said powder, while the D.C. field remains energized, to form a highly oriented magnet structure. The invention makes possible the recovery of nearly 100% of the total available magnetic energy of the finished magnet.

The invention will be more clearly understood from the following description taken in connection with the accompanying drawings, in which FIGURE 1 is a perspective view of a compacting die and field assembly useful in the practice of the invention;

FIGURE 2 is a planar cross-sectional view of the compacting die and poles of the field assembly of FIGURE 1; and FIGURE 3 is an elevational cross-sectional view of the die and poles of the field assembly of FIGURE 2, taken along the line 3—3 of FIGURE 2.

Referring more particularly to FIGURE 1 of the drawings, the compaction die comprises die 1 having cavity 2 for receiving lower punch 3 and upper punch 4. The die is fabricated from material of low magnetic permeability so that the magnetic flux will pass through the charge of magnetic material rather than the die. The die is surrounded by a silicon steel laminated core 5 which provides a return path for the flux of both the A.C. and D.C. fields. A.C. pole pieces 6 of laminated silicon steel and D.C. pole pieces 7 of high magnetic permeability steel are located radially between core 5 and die 1, the A.C. pole pieces being perpendicular to the D.C. pole pieces, and both A.C. and D.C. pole pieces being perpendicular to the direction of pressing in die cavity 2. The A.C. poles 6 are surrounded by insulated windings 8 and the D.C. pole pieces by similar windings 9. The windings are in each case connected to a suitable source of electrical current.

The details and relationship of the pole pieces to the compacting die are more clearly indicated in the cross-sectional view of FIGURES 2 and 3 which are drawn to scale. A.C. poles 6 are received in radial depressions 10 in the die 1. Tapered D.C. poles 7 are received in tapered radial depressions 11 in die 1. As can be seen in FIGURE 2, A.C. poles 6 are laminated to reduce eddy current and hysteresis losses. It should be noted that the D.C. poles are the width of the die cavity in the dimension facing the D.C. poles and the A.C. poles are about one half the width of the die cavity in the dimension facing the A.C. poles. The D.C. and A.C. poles should be at least two and preferably three times the height of the powder charge. This height will be determined by the adjustment of the lower punch and, of course, by the volume of the powder charge. The foregoing are optimum dimensional ratios and should not be construed as limiting unless otherwise indicated in the specification.

The present invention is applicable to any fine particle ferromagnetic material which derives its properties chiefly from shape anisotropy. Typical of such materials are iron, or alloys of iron and cobalt, iron and nickel, cobalt and nickel, or iron, cobalt and nickel. The invention is particularly useful with fine particle magnetic materials prepared in accordance with the teachings of the above-mentioned copending application, Serial No. 500,078. The particles are preferably stabilized against high temperature degradation by coating them with antimony to form an antimonide coating on the magnetic particles. Such coated particles and their method of preparation are more fully disclosed in copending application Serial No. 702,801, filed December 16, 1957, and assigned to the assignee of the present invention. It is further preferable that they be embedded in a non-magnetic matrix or binder material such as lead, such matrix material being more fully disclosed in copending application Serial No. 702,803, filed December 16, 1957, and assigned to the assignee of the present invention.

In carrying out the process of the present invention, elongated, single domain magnetic particles are electrolytically deposited into a molten metal cathode, usually mercury. The resulting slurry of magnetic particles and mercury is then heat treated at about 175–200° C. for 10 to 15 minutes to optimize the physical shape of the particles. Lead, or lead containing up to 2% by weight of antimony, as a matrix and antimony as a coating for the particles are then added to the slurry following which the slurry is again heat treated at 175–200° C. for about 10 to 15 minutes to promote formation of the antimonide. The coated, elongated, single domain particles are then pressed and aligned in a D.C. field together with the mercury and matrix material. The mercury is removed from the preforms by distillation and the preforms are prepared for orientation and compaction by grinding into a powder having a screen analysis within the range of about −20 to +400 mesh.

The bottom punch of the compaction press is then adjusted so that it is located from about 0.10 to about 0.375 inch below the bottom of the D.C. poles. The powder is charged into the die cavity to a height no greater than the center line of the D.C. poles. This adjustment of the bottom punch of the press and selection of the height of the powder charge have been found to permit optimum orientation of the powder. These values will of course vary with the quantity of charge, the field strengths and with variations in the design of the apparatus. The A.C. and D.C. fields are then energized at least a second or two before compaction begins. The A.C. and D.C fields need not be energized at the same moment, but both fields must be on simultaneously for at least a portion of the time prior to the compaction step. The top die punch is entered into the die cavity to compact the magnetic powder while the fields remain energized. If desired, the A.C. field may be de-energized during compaction but the D.C. field must remain energized during compaction to retain powder orientation. After compaction of the powder the fields are de-energized and the magnet structure removed.

For optimum results, the D.C. field strength should be at least 1400 and preferably 3500 gauss and should exceed the A.C. field strength, at least at the moment compaction begins. Ordinarily, the D.C. field should be greater, and preferably twice as great, as the A.C. field strength. All field strength measurements as herein set forth are as measured along a plane equidistant between the respective pole pieces.

While the A.C. poles have been described as perpendicular to and in the same plane as the D.C. poles, the position of the poles with respect to each other may be varied. Orientation takes place in a direction parallel to the direction of the D.C. field. The direction of orientation will therefore determine the location of the D.C. poles. However, the A.C. poles may, except as otherwise set out herein, be located in any desired position as long as the A.C. field passes through the powder charge.

The following examples illustrate the practice of the invention.

EXAMPLE 1

Fine particle iron was electrodeposited into a mercury cathode to form a slurry of mercury and the iron particles as disclosed in the above copending application, Serial No. 500,078. The slurry, containing 96.5 lbs. of mercury and 3.5 lbs. of iron particles, was heat treated for 14 minutes at 175° C. While still hot, 6.5 lbs. of lead as a matrix material, and 0.50 lb. of antimony as a coating material, were added to the slurry. The resultant mixture was heat treated for an additional period of 15 minutes at 175° C. After cooling, the mixture was pressed at a pressure of 10,000 p.s.i. in a die in the presence of a D.C. magnetic field of 4000 gauss to align the elongated iron particles in the direction of the field, to form preforms of the particles and to reduce the mercury content to about 80% of its original amount. Essentially all of the remaining mercury was then removed by distilling the material at a pressure of about 1 mm. of mercury for 1 hour at 350° C. This reduced the mercury to about 2% by weight of its original amount. The preform thus pressed was ground in a rotary cutter and completely mixed to yield a powder of uniform consistency. The bulk of the powder had a screen analysis between approximately −20 and +170 mesh.

EXAMPLE 2

Three grams of powder prepared as set out in Example 1 were loaded into a die. The compacting pressure was 25 tons per square inch. The bottom punch was located 0.375 inch below the bottom of the D.C. pole pieces. The D.C. coils were operated at 80 amps., and the A.C. coils at 50 amps. and 60 cycles. Approximately two seconds after the A.C. and D.C. fields were energized, the top punch was entered into the die cavity and the magnets were pressed into their final shape, while the A.C. and D.C. fields remained energized. The D.C. field strength was 4500 gauss as measured along a plane equidistant between the A.C. pole pieces. The A.C. field was 2200 gauss as similarily measured between the A.C. poles. After termination of compaction, the fields were de-energized.

The degree of particle alignment obtained was determined by the ratio of residual induction (B$r$) to intrinsic saturation induction (B$is$) as determined in an Isthmus permeameter. The following Table A records these values together with the coercive force (Hc) and maximum magnetic energy (BH max.) for preforms prepared in accordance with Example 1 before grinding. Results are also tabulated for similarly prepared preforms of iron-cobalt particles.

Table A

| Material | Br | B$is$ | Hc | (BH) max. | Br/B$is$ |
|---|---|---|---|---|---|
| Elongated Single Domain Iron Particles | 6,500 | 8,490 | 600 | $1.7 \times 10^6$ | 0.776 |
| Elongated Single Domain Iron-Cobalt Particles | 7,800 | 8,500 | 900 | $3.4 \times 10^6$ | 0.918 |

The above values for the Br/B$is$ ratio represent the intrinsic alignment of preforms of the elongated, single domain particles as obtained during processing and prior to compaction and orientation. They therefore afford comparative values for determining the improvement obtained by following the practice of the present invention.

Three-gram samples of iron powder and of iron-cobalt powder, prepared in accordance with Example 1 were compacted and oriented in accordance with the procedure of Example 2. The various energy values were then determined. Repetition of these tests several times produced the same results. The results are shown in the following Table B:

Table B

| Material | Br | B$is$ | Hc | (BH) max. | Br/B$is$ |
|---|---|---|---|---|---|
| Elongated Single Domain Iron Particles | 5,325 | 6,875 | 650 | $1.75 \times 10^6$ | 0.775 |
| Elongated Single Domain Iron-Cobalt Particles | 7,400 | 8,025 | 965 | $3.6 \times 10^6$ | 0.922 |

Tables A and B illustrate that approximately the same orientation or directionality is obtained in finished magnets prepared from fine particle powder as is obtained from preforms of the slurry containing fine particles, mercury and matrix. The significance of this comparison will be apparent when it is realized that particles of magnetic material are relatively easily aligned in the preforms because they are present in an approximately 95% mercury slurry whereas the fine particle powder consists of substantially only magnetic powder and solid matrix material.

In order to determine the effect of the addition of a variety of lubricants on the practice of the present invention, a number of 10-gram samples of magnetic powder were compacted and oriented in accordance with the practice of Example 2, except that prior to compaction, they were mixed with varying amounts of a number of different lubricants. The lubricants were in each case used with a 10-gram sample of powder. These powder samples were successively mixed with from 1 to 7 cc. of water, from 1 to 33 cc. of ethyl alcohol, from 1 to 3 cc. of glycerine, and from 0.01 to 0.50 gram of a dry powder lubricant used in powder metallury and sold under the trade name Stero-Tex. It was found that equivalent alignment could be achieved with larger powder charges when lubricants were used. It was also found that small amounts of lubricants acted equally well in giving a slight improvement in particle alignment. Water, however, proved equal to the other lubricants and its use is therefore recommended. The optimum ratio proved to be 1 gram of powder to 2.5 cc. of water. Physical and magnetic tests indicated that essentially all of the liquid lubricant is extruded from the magnet when pressed.

Additional tests were run to determine whether magnetic materials containing elongated magnetic particles could be oriented in directions other than that perpendicular to the direction of pressing. It is difficult to orient and compact magnetic powder containing elongated magnetic particles on an axis parallel to the direction of pressing because the direction of pressing has some tendency to align the particles in a direction perpendicular to pressing. The results of these tests showed that directional properties can be achieved in the direction of pressing by placing a D.C. coil on each of the two punches and an A.C. coil on each of four poles in the same plane on all four radial sides of the charge, the A.C. coils being perpendicular to the D.C. coils. This is the only present means known for obtaining a significant amount of powder orientation in magnetic materials containing elongated, magnetic particles parallel to the direction of pressing.

What we claim as new and desire to secure by Letters Patent of the United States is:

1. A process for orienting and compacting fine particle magnetic powder whose properties are derived from shape anisotropy, said process comprising simultaneously applying an alternating and direct current field to a quantity of said powder and compacting said powder while said direct current field remains energized to form a compacted and highly oriented magnet structure.

2. A process for orienting and compacting fine particle magnetic powder, said powder comprising elongated, single domain magnetic particles coated with an antimonide coating and embedded in a matrix selected from the group consisting of lead and lead antimony alloy containing up to about 2% by weight of antimony, said process comprising simultaneously applying an alternating and direct current field to a quantity of said powder and compacting said powder while said direct current field remains energized to form a compacted and highly oriented magnet structure.

3. The process of claim 2 in which the elongated, single domain magnetic particles forming said powder are selected from the class consisting of (1) iron and (2) alloys of cobalt and iron.

4. A process for orienting and compacting fine particle magnetic powder whose properties are derived from shape anisotropy, said process comprising simultaneously applying an alternating and direct current field to a quantity of said powder, said alternating and direct current fields being applied in essentially the same plane and in a direction substantially perpendicular to each other and compacting said powder while said direct current field remains energized to form a compacted magnet structure possessing a high degree of orientation in the direction of the direct current field.

5. A process for orienting and compacting fine particle magnetic powder whose properties are derived from shape anisotropy, said process comprising simultaneously applying an alternating and direct current field to a charge of said powder contained in a die cavity, said direct current field being at least 1400 gauss and said direct current field being greater than said alternating current field, the bottom of said charge in said die cavity being from about 0.10 to about 0.385 inch below the bottom of the poles supplying said direct current field, the poles for supplying said direct and alternating current fields being at least twice the height of the powder charge, and compacting said powder while said direct current field remains energized to form a compacted magnet structure possessing a high degree of orientation in the direction of the direct current field.

6. An apparatus for orienting and compacting fine particle magnetic powders whose properties are derived from shape anisotropy, said apparatus comprising a die having a cavity and means for compacting magnetic powder within said die cavity, alternating current and direct current pole pieces located around said die cavity, means for supplying alternating current and direct current fields to said alternating current and direct current pole pieces respectively so that alternating and direct current fields pass through said die cavity, and means for providing a return path for completing the alternating current and direct current fields.

7. An apparatus for orienting and compacting fine particle magnetic powders whose properties are derived from shape anisotropy, said apparatus comprising a die having a cavity and means for compacting magnetic powder within said die cavity, alternating and direct current pole pieces located radially around said die cavity, said poles being substantially in the same plane, the alternating current pole pieces being substantially perpendicular to the direct current pole pieces, means for supplying alternating current and direct current fields to said alternating current and direct current pole pieces respectively so that alternating and direct current fields pass through said die cavity, and means for providing a return path for completing the alternating and direct current fields.

References Cited in the file of this patent

UNITED STATES PATENTS

| | | |
|---|---|---|
| 2,384,215 | Toulmin | Sept. 4, 1945 |
| 2,742,185 | Landry | Apr. 17, 1956 |
| 2,762,778 | Gorter et al. | Sept. 11, 1956 |
| 2,959,823 | Schwabl et al. | Nov. 15, 1960 |

FOREIGN PATENTS

| | | |
|---|---|---|
| 558,366 | Canada | June 3, 1958 |